(12) United States Patent
Spivak et al.

(10) Patent No.: US 10,305,745 B2
(45) Date of Patent: May 28, 2019

(54) METHOD AND SYSTEM FOR CREATING AND MANAGING AGGREGATION SERVICE HIERARCHIES

(71) Applicant: VMware, Inc., Palo Alto, CA (US)

(72) Inventors: Vadim Spivak, Emerald Hills, CA (US); Maithem Munshed, Palo Alto, CA (US); Amar Padmanabhan, Menlo Park, CA (US); Michi Mutsuzaki, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 376 days.

(21) Appl. No.: 15/187,774

(22) Filed: Jun. 20, 2016

(65) Prior Publication Data
US 2017/0366407 A1    Dec. 21, 2017

(51) Int. Cl.
*H04L 12/24* (2006.01)

(52) U.S. Cl.
CPC .................................. *H04L 41/12* (2013.01)

(58) Field of Classification Search
None
See application file for complete search history.

(56) References Cited

U.S. PATENT DOCUMENTS

| | | | | |
|---|---|---|---|---|
| 2002/0032850 A1* | 3/2002 | Kauffman | ............. | G06F 9/5077 712/31 |
| 2009/0083390 A1* | 3/2009 | Abu-Ghazaleh | ........ | G06F 15/16 709/209 |
| 2009/0300624 A1* | 12/2009 | Branson | ................ | G06F 9/5038 718/102 |
| 2012/0020370 A1* | 1/2012 | Sonnier | ................. | H04L 47/621 370/412 |
| 2014/0348022 A1* | 11/2014 | Jain | ........................ | H04L 12/185 370/254 |
| 2015/0312326 A1* | 10/2015 | Archer | ................ | G06F 9/45558 709/226 |

\* cited by examiner

*Primary Examiner* — Philip J Chea
*Assistant Examiner* — Hassan A Khan
(74) *Attorney, Agent, or Firm* — Thomas Horstemeyer, LLP

(57) ABSTRACT

Techniques disclosed herein provide an approach for creating and managing aggregation service hierarchies, such as hierarchies used in distributed scheduling services and heartbeat services. In one embodiment, management nodes accept host computer registration events and add host computers to a hierarchy used as the aggregation mechanism in an aggregation service. The management nodes each manage a portion of the hierarchy and configure registered hosts to take the roles of leaf, branch, and root nodes in the hierarchy. Further, the management nodes dynamically mutate the hierarchy by reassigning host roles, in response to host additions and failures, thereby maximizing fault tolerance/high availability and efficiency.

20 Claims, 6 Drawing Sheets

A

B

METHOD AND SYSTEM FOR CREATING AND MANAGING AGGREGATION SERVICE HIERARCHIES

CROSS-REFERENCE TO RELATED APPLICATION(S)

The present application is related to U.S. Application No. 15/187,772, filed Jun. 20, 2016, and entitled "Distributed Hierarchical Scheduler", which is assigned to the same assignee as the present application and has been filed on the same day as this application. The aforementioned related patent application is herein incorporated by reference in its entirety.

BACKGROUND

A scheduler is a software component that finds optimal assignments of resource consumer requests to available resources. The available resources are typically divided into sets of resource buckets which may represent, e.g., host computers, data stores, networks, etc. The purpose of the scheduler is then to match the needs of a resource consumer to a specific resource bucket. For example, the consumer may obtain a placement of a virtual computing instance (e.g., a virtual machine or container) on a specific host computer, and the virtual computing instance may then be created on that host computer.

In scheduler and other services, it may be necessary to gather information from each of a number of host computers. For example, a scheduler service may need to know the available resources on multiple host computers. One approach to obtain such information from multiple host computers is for a single process or machine to query each host computer for the required information. However, this approach does not scale well as the number of hosts increases in, e.g., a cloud.

SUMMARY

One embodiment provides a computer-implemented method which includes receiving a registration message from a host computer and determining whether the host computer can be assigned as a child of an existing leaf node in a hierarchy of nodes for an aggregation service, based on at least one of a predefined heuristic which must be satisfied for the assignment and a maximum branching factor which specifies a maximum number of children each node in the hierarchy can have. The method further includes, if the host computer can be assigned as a child of an existing leaf node, configuring the host computer as the child of the existing leaf node, and, if the host cannot be assigned as a child of an existing leaf node, configuring the host computer to take the role of a new leaf node in the hierarchy.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for creating and managing aggregation service hierarchies. In one embodiment, management nodes accept host computer registration events and add the host computers to a hierarchy that is used as the aggregation mechanism in the aggregation service, which may be a distributed scheduling service for placing resource consumers on host computers, a heartbeat service, or the like. The management nodes each manage a portion of the hierarchy and configure registered hosts to take the roles of leaf, branch, and root nodes in the hierarchy. Further, the management nodes dynamically mutate the hierarchy by reassigning host roles, in response to host additions and failures, to maximize fault tolerance/high availability as well as efficiency.

In embodiments described herein, virtual computing instances, such as virtual machines (VMs) and containers, are sometimes used as examples of resource consumers. However, it should be understood that resource consumers may comprise any consumer of computing resources, including other cloud-native (distributed) applications. Therefore, even though virtual computing instances are used for simplicity in some examples herein, other embodiments are within the scope of this disclosure.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
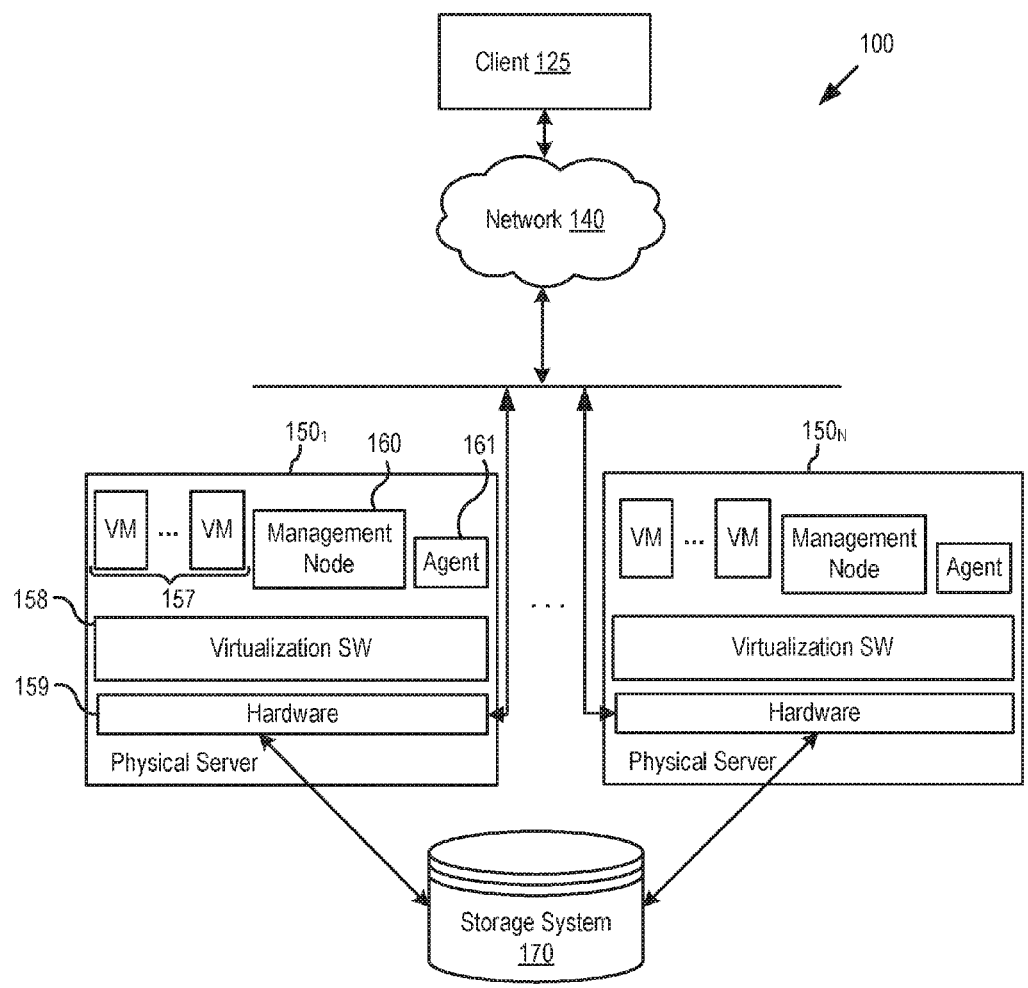
FIG. 1 illustrates components of a system in which an embodiment may be implemented.

FIG. 1 illustrates components of a computer system architecture 100 in which an embodiment may be implemented. As shown, virtual computing instances (shown as virtual machines (VMs) 157) are instantiated on a plurality of host computers $150_{1-N}$, each of which includes virtualization software 158 and hardware 159, is controlled by a virtual machine management server 140, and is coupled to a shared persistent storage system 170. Although a virtualized system 100 is shown as an example, it should be understood that techniques disclosed herein are equally applicable to non-virtualized systems that do not involve virtual computing instances running on host computers, such as systems with typical operating systems (OSes) running on computers. Host computers $150_{1-N}$ may be constructed on server class hardware platforms, which may be, e.g., x86 architecture platforms that each includes a processor, system memory, and disk drive, among other things. Illustratively, host computers $150_{1-N}$ are in communication with client device 125 via a network 140 (e.g., the Internet). For example, system 100 may be a virtual desktop infrastructure (VDI) in which desktop operating systems, hosted on VMs 157, are delivered as a managed service to end users via network 140. For simplicity, a single network 140 is shown, but it should be recognized that, in actual implementations, the components of system 100 may be connected over the same network or different networks.

Virtualization software layer 158, also referred to hereinafter as the hypervisor, is installed on top of the hardware platform of host computers $150_{1-N}$. Hypervisor 158 supports a virtual machine execution space within which multiple virtual desktops (i.e., virtual machines running desktop operating systems and applications) may be concurrently instantiated and executed. In one embodiment, for each virtual desktop, hypervisor 158 provides a corresponding virtual machine monitor (VMM) that implements virtualization support such as emulated hardware to coordinate operations between hypervisor 158 and the virtual desktop.

Although VMs 157 and hypervisor 158 are shown in FIG. 1, virtual machines are an example of virtual computing instances and hypervisors as an example of a hardware abstraction layer. As discussed, techniques disclosed herein are applicable to other virtual computing instances, such as containers not including a guest operation system (OS), referred to herein as "OS-less containers" or simply "containers," as well as other cloud-native (distributed) applications. OS-less containers in particular implement operating system—level virtualization, wherein an abstraction layer is provided on top of the kernel of an operating system on a host computer. Each OS-less container may run as an isolated process in userspace on the host operating system and share the kernel with other containers. In such a case, the OS-less container relies on the kernel's functionality to make use of resource isolation (CPU, memory, block I/O, network, etc.) and separate namespaces and to isolate the application's view of the operating environments.

In the embodiments described herein, components of an aggregation service are organized into a hierarchy, such as a tree. Such a hierarchy is created by management node(s) 160, running in one or more of host computers $150_{1-N}$, which configure host computers $150_{1-N}$ to take the role of nodes in the hierarchy and keep the roles up to date to reflect a correct and functional hierarchy, as discussed in greater detail below. In one embodiment, management node(s) 160 may be applications running in OS-less container(s), although it should be understood that management node(s) 160 may also be implemented in other ways (e.g., as applications running in VM(s) 157 or on typical operating system(s)). Each of host computers $150_{1-N}$ further includes an agent 161. In one embodiment, agent 161 may be a process running on hypervisor 158, but it should be understood that agent 161 may also be implemented differently (e.g., as a process or application running on an operating system or inside a VM or OS-less container). Agents (e.g., agent 161) are responsible for registering the host computer $150_{1-N}$ in which they run with management node(s) 160, receiving assignments as leaf, branch, and root nodes in a hierarchy of nodes, and undertaking the roles of such nodes. That is, it should be understood that although hosts are described herein as being configured as leaf, branch, and root nodes of a hierarchy and undertaking certain actions, the configurations are actually applied to agents running in the hosts, which also perform the actions of the leaf, branch, and root nodes. In another embodiment, management node(s) 160 may also create multiple hierarchies having both the same logical leaf and root nodes.

Figure 2:
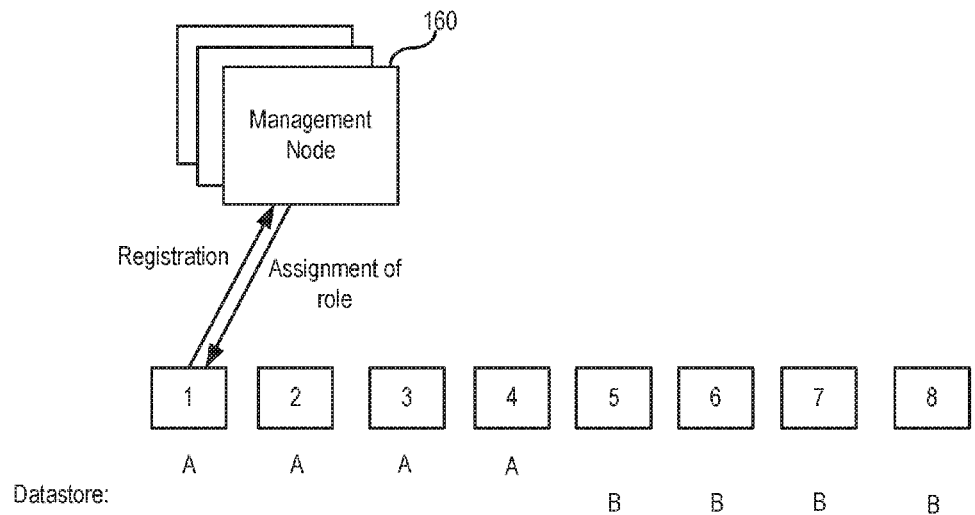
FIG. 2 illustrates an approach for assigning roles to host computers to create an aggregation service hierarchy, according to an embodiment.
Figure 2:
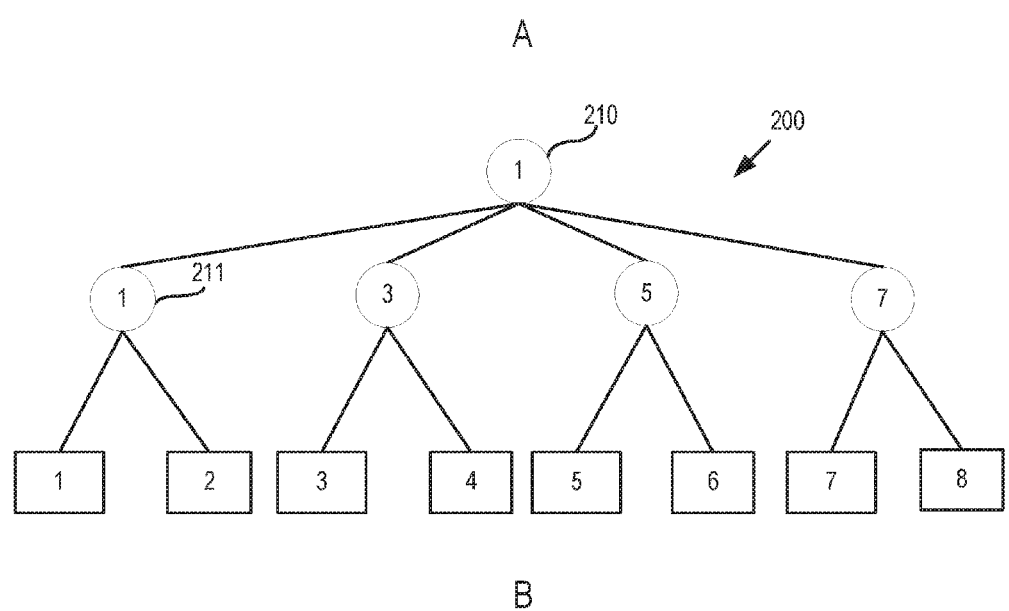

FIG. 2 illustrates an approach for assigning roles to host computers to create an aggregation service hierarchy, according to an embodiment. As shown in panel A, management nodes 160 receive registration messages from hosts (e.g., host 1), and, in turn, assign roles to those hosts (in particular, to the agents running on those hosts). In one embodiment, management nodes 160 may configure hosts 1-8 as leaf, branch, and root nodes in an aggregation service hierarchy. Illustratively, hosts 1-4 and 5-8 have access to datastores A and B, respectively. As a result, management nodes 160 may cluster hosts 1-4 and 5-8 together in the hierarchy, an example of which is shown in panel B. Such clustering permits hosts with access to particular resources to be located more easily, as similar hosts are clustered together. For example, a clustering heuristic may help minimize the time it takes a host to join/leave an underlying cluster (e.g., a VSAN) and maximize a schedule-and-place operation's efficiency when using the hierarchy. As shown, host 1 has been configured to take the roles of leaf node 211 as well as root node 210. Host 2, which shares datastore A with host 1, is configured as a child of leaf node 211. Hosts 3-8 may be configured in a similar manner. An approach for creating and managing hierarchies such as hierarchy 200 is discussed in greater detail below with respect to FIGS. 3-6. Although discussed herein with respect to leaf nodes (e.g., leaf node 211) having hosts as children, which treats the hierarchy as a tree of agents, the hosts themselves could also be considered leaf nodes of the overall hierarchy, with the agents as root and intermediate/branch nodes of the hierarchy.

Once constructed, hierarchy 200 may be employed as the aggregation mechanism in any feasible service which requires aggregation. Each role taken by a host may be associated with computational capabilities that can be applied on children of a hierarchical node, with results reported back to parents of the node. The hierarchical structure of the hosts and the computational capabilities of each role type provide the aggregation mechanism in the aggregation service. For example, in a scheduler service used to place resource consumers (e.g., VMs or OS-less containers) on host computers 1-8, root node 210 may propagate a placement request down hierarchy 200 to hosts 1-8. In turn, each of hosts 1-8 may respond with a score indicating its free resources (for example, in total or percentage terms), which are aggregated by propagating up the highest score, indicating the host with the most free resources, at each node. In such a case, the host computer associated with the highest score that reaches root node 210 may be chosen by root node 210 for the resource consumer placement. As another example, in a heartbeat service, hierarchy 200 may be used to transmit heartbeat messages to and receive responses from nodes that each monitor their own children. In such a case, root node 210 may monitor the leaf nodes (e.g., leaf node 211) that monitor their child hosts (root node 210 itself does not have a parent and is not monitored "actively", but this is not a problem as multiple roots can be run at the same time, as discussed below). Doing so permits hosts that go down or otherwise become unavailable to be identified. Further, the logical tree of hierarchy 200 may be dynamically reshuffled when hosts become unavailable, thereby providing fault tolerance. For example, if host 1 becomes unavailable, then leaf node 211 and root node 210, to which host 1 is assigned, will also be down. In such a case, management node 160 may select another host such as a child of leaf node 211 (e.g., host 2) to take the roles of leaf node 211 and root node 210.

Figure 3:
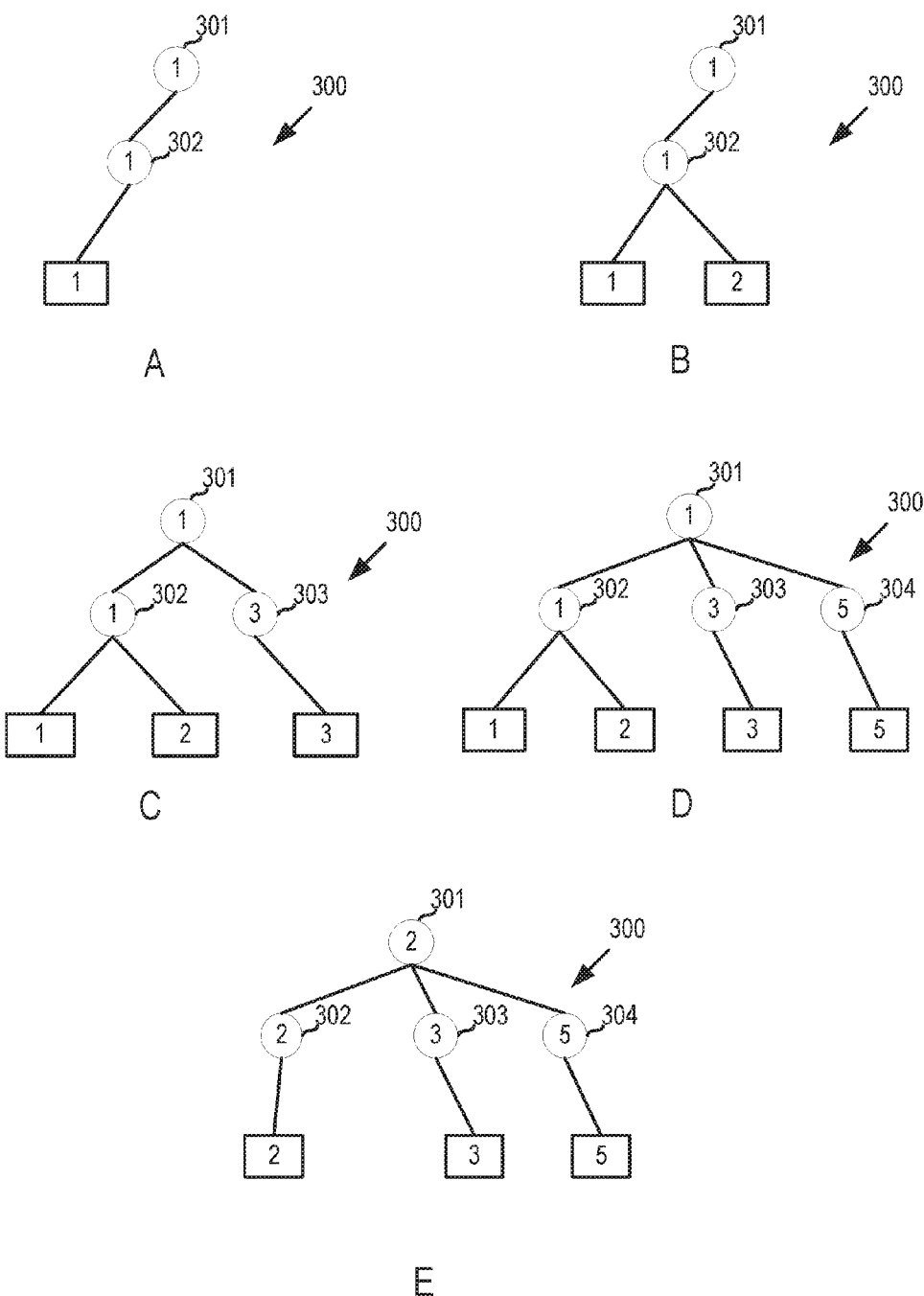
FIG. 3 illustrates an example of building an aggregation service hierarchy, according to an embodiment.

FIG. 3 illustrates an example of building an aggregation service hierarchy, according to an embodiment. As shown in panel A, host computer 1, which is the same as that shown in FIG. 2 and has access to datastore A, is configured by management node 160 to take the role of leaf node 302 in hierarchy 300. As discussed, host computer 1 initially transmits a registration message to management node 160 to indicate its presence as well as other information such as resources (e.g., data stores, networks, special hardware, graphics cards, etc.) that host computer 1 has access to. Then, management node 160 adds host computer 1 to hierarchy 300 by configuring host computer 1 to take the roles of one or more nodes in hierarchy 300, including that of leaf node 302. Each node in hierarchy 300 that is a parent node is configured to monitor its children and emit events notifying management node 160 when its children are missing or have been resurrected. In this case, host computer 1 is assigned the role of leaf node 302 and monitors itself, the only child of leaf node 302.

In addition to configuring host computer 1 as leaf node 302 in hierarchy 300, management node 160 further determines that hierarchy 300 does not have a root node, as host computer 1 is the first host computer to be added to hierarchy 300. In response, management node 160 configures host computer 1 to also take the role of root node 301.

As shown in panel B, when host computer 2 registers with management node 160, management node 160 determines where to add host computer 2 in hierarchy 300 using a clustering heuristic and a maximum branching factor. The maximum branching factor specifies the maximum number of children each node in hierarchy 300 can have and/or the maximum number of levels that hierarchy 300 can have. For purposes of illustration, the maximum branching factor is assumed to be two children per node and two total levels in hierarchy 300. In one embodiment, the limit on the levels/height of hierarchy 300 may be implicitly implied by the branching factor, without being specified explicitly.

The clustering heuristic is a property that logically clusters similar host computers and must be satisfied to assign a particular node role to a host computer. As discussed, clustering permits hosts with access to desired resources to be located more easily, as similar hosts are clustered together. The clustering heuristic may thus help minimize the time it takes a host to join/leave an underlying cluster (e.g., a VSAN) and maximize a schedule-and-place operation's efficiency when using the hierarchy. In one embodiment, the clustering heuristic may specify that resources available to a host must be a superset or a subset of resources available to a leaf node (and to branch nodes, if any, which are unions of all child sets) to which the host is being added, where the resources may include any attributes such as network connections, access to datastores, auxiliary hardware being on the hosts, etc. That is, a set of one or multiple resource types may be compared to determine whether the set is a subset/superset of another set. Use of the subset or superset heuristic ensures that a new host being added as a child to a leaf node has some of the same resources (in the subset case) or more resources (in the superset case) as other hosts associated with the leaf node. For example, host computer 1 has access to datastore A and host computer 2 also has access to datastore A, so if the resource being considered is access to a set of datastores, then the resources available to host computer 2 is a subset (and a superset) of the resources available to leaf node 302, i.e., host computer 1. That being the case, management node 160 adds host computer 2 as a child to leaf node 302.

As shown in Panel C, when host computer 3 registers with management node 160, management node 160 makes the same determination on where to add host computer 3 in hierarchy 300 based on the clustering heuristic and the maximum branching factor. In this case, the clustering heuristic indicates that host computer 3 can be a child of leaf node 302, as host computer 3 also has access to datastore A, like leaf node 302. However, the maximum branching of 2 children per node would be exceeded if host computer 3 were added as a child of leaf node 302. As a result, management node 160 instead configures host computer 3 to take the role of a new leaf node 303 which is created as a child of root node 301.

As show in Panel D, when host computer 5 registers with management node 160, management node 160 again determines where to add host computer 5 in hierarchy 300 based on the clustering heuristic and the maximum branching factor. Although the maximum branching factor of two children per node permits another child to be added to leaf node 303, host computer 5 only has access to datastore B and does not satisfy the clustering heuristic that it has access to datastores that are a subset or superset of datastore A that leaf node 303 has access to. As a result, management node 160 configures host computer 5 to take the role of new leaf node 304.

Panel E illustrates the case where host computer 1 goes down or otherwise becomes unavailable. As shown, management node 160 reassigns host computer 2 to take the roles of leaf node 302 and root node 301 that host computer 1 was previously assigned to. As a result of such mutation of hierarchy 300, the failure of host computers such as host 1 do not have significant impact on the aggregation service which relies on hierarchy 300.

Although discussed above with respect to management node 160 creating hierarchy 300, it should be understood that each host computer may instead register with one of a number of management nodes, each of which emits registration events to other management nodes and configures and maintains a subset of hosts that have registered with it. In such a case, each management node (e.g., management node 160) may only create a portion of hierarchy 300 associated with the host computers which it manages. However, each of the management nodes may share information indicating their portion of hierarchy 300 such that every management node has a global view of the overall hierarchy 300.

Figure 4:
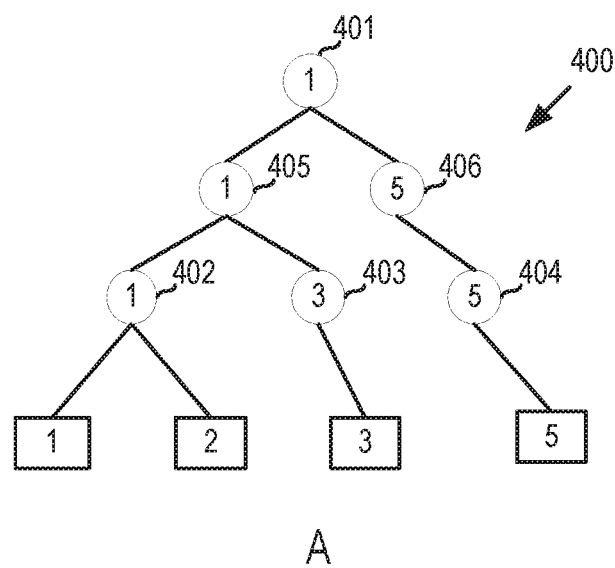
FIG. 4 illustrates additional examples of an aggregation service hierarchy, according to an embodiment.
Figure 4:
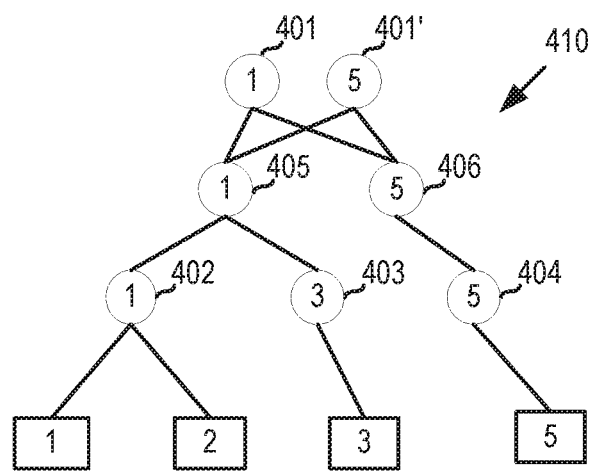

FIG. 4 illustrates additional examples of an aggregation service hierarchy, according to an embodiment. As shown in Panel A, hierarchy 400 includes three levels, as opposed to the two level hierarchy 300 depicted in FIG. 3. Although three levels are shown, it should be understood that hierarchy 400 may generally include any number of levels. For example, if a host computer that is not sufficiently powerful is configured as root node 401, then a larger number of hierarchy levels may be created to reduce the load on root node 401, and vice versa. Similar to two-level hierarchy 300, management node 160 creates three-level hierarchy 400 by configuring hosts 1-3 and 5 to take the roles of leaf nodes 402-404 and root node 401, as well as branch nodes 405-406. Illustratively, host computer 1 is configured as branch node 405 and host computer 5 is configured as branch node 406.

As shown in Panel B, hierarchy 410 includes the same nodes as hierarchy 400, and also includes an extra root node 401' whose role is assigned to host 5. Assigning more than one root node provides fault tolerance, as another root node may take over when one root node host becomes unavailable. In one embodiment, one root node may be in an active mode, while other root node(s) are kept in a standby mode until the active root node goes down. In another embodiment, more than one root node may be active. In addition to multiple root nodes, multiple branch nodes may also be created.

Figure 5:
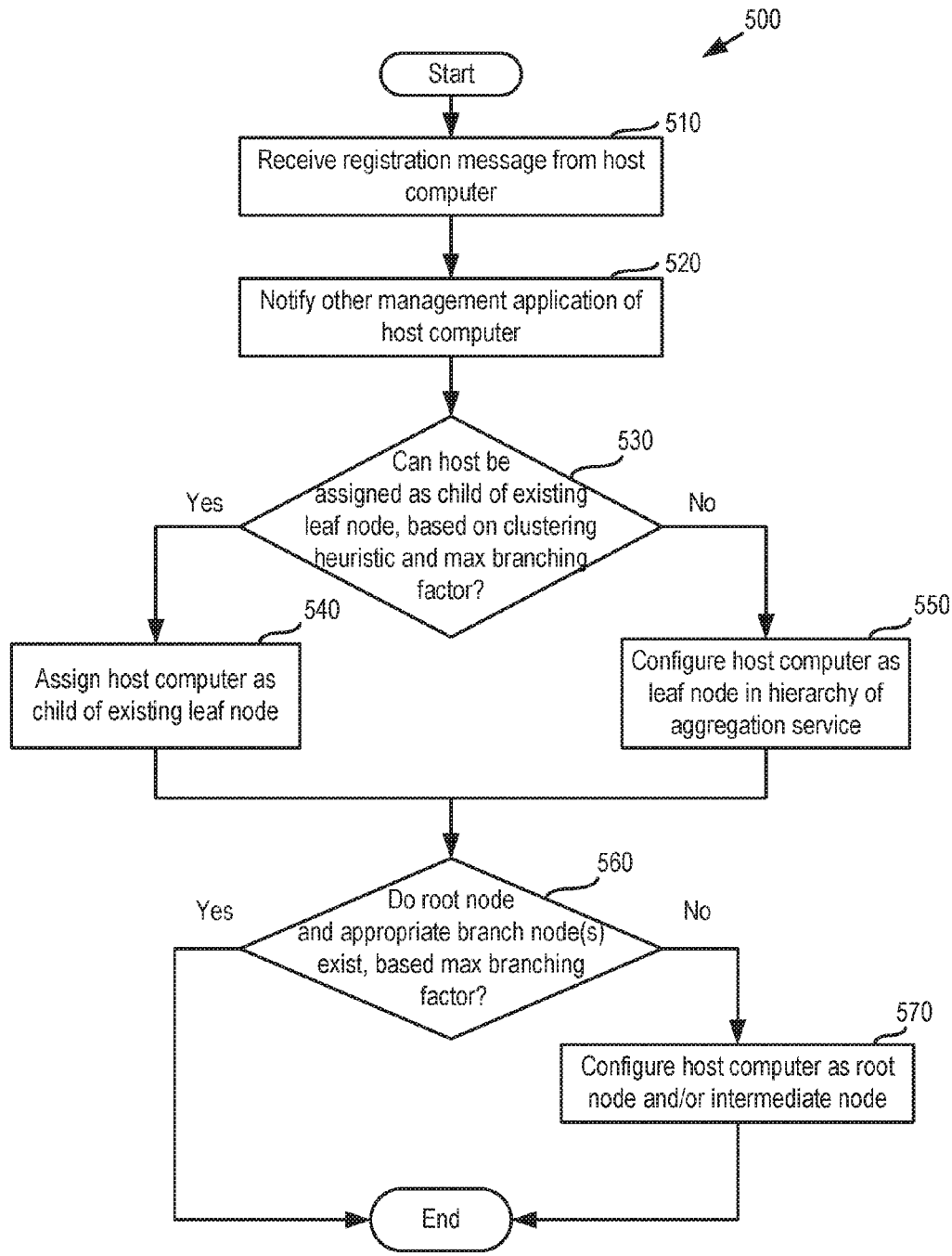
FIG. 5 illustrates a method for creating an aggregation service hierarchy, according to an embodiment.

FIG. 5 illustrates a method 500 for creating an aggregation service hierarchy, according to an embodiment. As shown, method 500 begins at step 510, where management node 160 receives a registration message from a host computer. Each host computer runs an agent 161 which is configured to register with management node 160 by transmitting a registration message to notify management node 160 of the presence of the host computer and resources (e.g., data stores, networks, special hardware, graphics cards, etc.) that the host computer has access to.

At step 520, management node 160 notifies other management nodes of the host computer. As discussed, each management node builds a portion of an aggregation service hierarchy incrementally, and multiple management nodes cooperate to build the entire hierarchy through a distributed decision-making process. When a host computer is registered to a management node, the management node that receives the registration message emits an event to all other management nodes so that each management node can build a global view of the hierarchy to use in their local decision-making. Although every management node is aware of the newly registered host computer, only one of the management nodes, such as the management node that receives the registration message, is responsible for configuring and maintaining the host. In one embodiment, management node 160 may also notify the other management nodes of the assigned role(s) of the host computer, although the other management nodes may not use such information on the assigned role(s) to make their own assignment decisions.

At step 530, management node 160 determines whether the host computer can be assigned as a child of an existing leaf node, based on a clustering heuristic and a maximum branching factor. The clustering heuristic is a property that logically clusters similar host computers in the hierarchy. In one embodiment, the clustering heuristic may specify that resources available to a host must be a superset or a subset of resources available to a leaf node to which the host is being added. Only if this property is satisfied can management node 160 add the host computer as a child of a particular leaf node. The maximum branching factor specifies the maximum number of children each node in the hierarchy can have and/or the maximum number of levels that the hierarchy can have. For example, a host computer may only be assigned as a child of a particular leaf node if that leaf node has less than the maximum number of children.

At step 540, if the host computer can be assigned as a child of an existing leaf node, then management node 160 configures the host computer to take the role of a child of an existing leaf node. More specifically, if management node 160 determines that both the clustering heuristic and the maximum branching factor are satisfied for a particular assignment of the host computer as a child of the existing leaf node, then management node 160 transmits a message to an agent running on the host computer notifying the agent of its role as a child of the existing leaf node.

At step 550, if the host cannot be assigned as a child of an existing leaf node, then management node 160 configures the host computer itself as a leaf node. More specifically, if management node 160 determines either the clustering heuristic or the maximum branching factor is not satisfied for any assignment of the host computer to an existing leaf node, then management node 160 transmits a message to the agent running on that host computer notifying the agent of its role as a new leaf node.

At step 560, management node 160 determines whether a root node exists and branch node(s) exist between the leaf node and the root node, based on the maximum branching factor. As discussed, when a host computer is added to a new hierarchy or to a new leaf node, management node 160 may also need to assign the host computer to be the root node of the hierarchy and/or one or more branch nodes needed to satisfy the number of levels specified in the maximum branching factor.

At step 570, if the root node and/or appropriate branch node(s) do not exist, then management node 160 further configures the host computer as the root and/or branch nodes by, e.g., transmitted a message specifying the same to the agent running on the host computer.

As discussed, the aggregation service hierarchy created according to method 500 may be used in any feasible service which requires aggregation, such as heartbeat or distributed scheduling services. In the case of the heartbeat service, the aggregation service hierarchy may be used to transmit heartbeat messages to and receive responses from nodes that each monitor their own children. That is, root node may monitor leaf nodes that in turn monitor their own child hosts, etc. By sending heartbeat messages down the hierarchy and receiving responses indicating whether monitored hosts are running, hosts that go down or otherwise become unavailable may be identified. In the case of the distributed scheduling service, requests for placing resource consumers (e.g., VMs or OS-less containers) on hosts may be issued to a root scheduler of the aggregation service hierarchy and propagated down the hierarchy, either to all children or to randomly selected subsets of children of each branch node in the hierarchy. When the requests are ultimately received by the hosts, each host may respond with a score indicating free resources (for example, in total or percentage terms) on that host, which are aggregated by propagating back up the hierarchy the highest score, indicating the host with the most free resources, at each node of the hierarchy. The host computer associated with the highest score that is propagated up to the root node may then be chosen as the host on which the resource consumer is placed.

Figure 6:
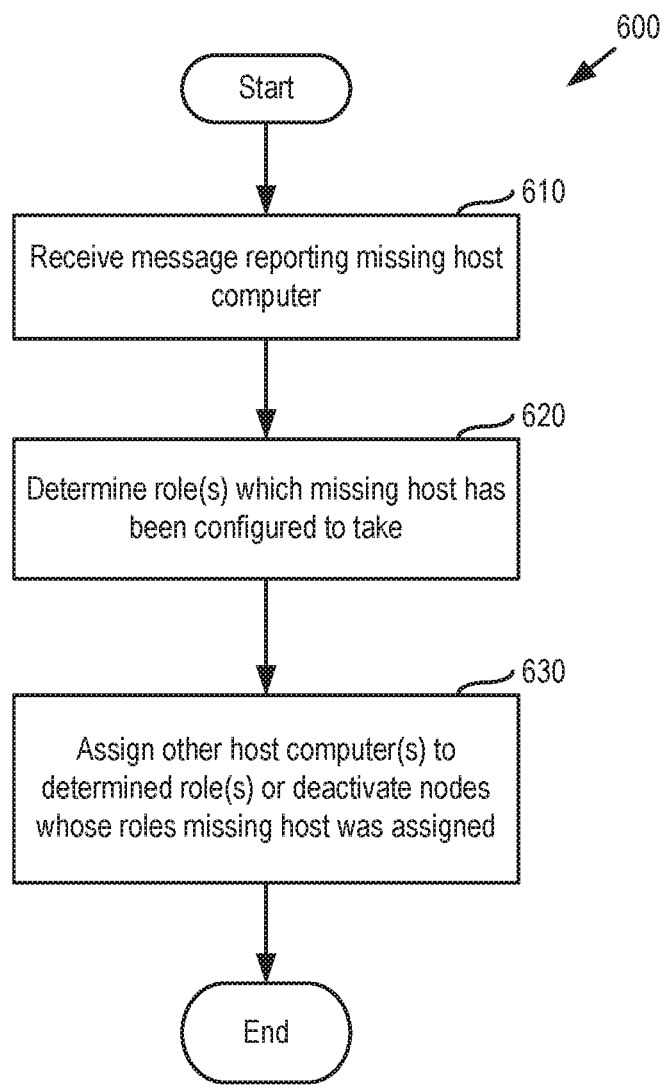
FIG. 6 illustrates a method for managing an aggregation service hierarchy after a host becomes unavailable, according to an embodiment.

FIG. 6 illustrates a method 600 for managing an aggregation service hierarchy after a host computer becomes unavailable, according to an embodiment. As shown, method 600 begins at step 610, where management node 160 receives a message reporting that a host computer is missing. As discussed, each parent node in the hierarchy is responsible for monitoring its children and emitting an event indicating a child node is missing when that node cannot be reached. Such an event may be emitted to any of the management nodes, as each management node has a global view of the hierarchy. In one embodiment, missing nodes may be discovered level by level. For example if a host owns a branch scheduler and a leaf scheduler and that host goes down, then the root scheduler will discover that the branch scheduler is down, and once a new branch scheduler is assigned, then the leaf scheduler will be discovered to be down and reported, and so forth.

At step 620, management node 160 determines the role(s) which the missing host computer has been configured to take. As discussed, each host computer may be configured to take one or more roles as leaf nodes, branch nodes, and/or root nodes of the hierarchy by assigning the agent running on the host computer to those role(s), which the agent then performs. Management node 160 has a global view of the hierarchy and can identify each of the missing host's role(s).

At step 630, management node 160 assigns other host computer(s) to the determined role(s) of the missing host or deactivates the node(s) whose role(s) the missing host was assigned, as appropriate. For example, management 160 may configure one of the missing host computer's sibling hosts that is a child of the same leaf node to take the role(s) of the missing host by sending such a configuration to an agent running on the sibling host. If no such sibling exists, then the leaf node, and perhaps also parents of the leaf node, may be deactivated.

When the missing host computer becomes available again, the leaf node that is a parent of that host may emit an event indicating the same. In one embodiment, management node 160 may then reassign the host computer to its previous role(s).

Advantageously, techniques disclosed herein create and manage aggregation service hierarchies for services such as heartbeat and distributed scheduling services, among others. By employing multiple management nodes and configuring and updating host computers to take various roles in a hierarchy, the aggregate service can be made highly available and substantially immune to failures of individual management nodes and host computers. In particular, the hierarchy may be dynamically mutated in response to host additions and failures, thereby allowing the system to scale well as the number of hosts increases and to maximize the aggregation service's fault tolerance/high availability as well as its efficiency.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method, comprising:
   receiving, from an agent executed by a host computer, a registration message comprising an indication of hardware resources available to the host computer;
   identifying a requirement that must be satisfied for the host computer to be assigned as a child host of an existing leaf node in a hierarchy of nodes of a distributed service, wherein the requirement specifies that the hardware resources available to the host computer must include at least one of: a subset of resources available to at least one existing child host of the existing leaf node, and a superset of resources available to the at least one existing child host;
   determining that the host computer cannot be assigned as the child host of the existing leaf node based on the requirement; and
   configuring the agent of the host computer to take a role of a new leaf node created in the hierarchy, wherein the agent causes the host computer to execute a resource consumer associated with the new leaf node.

2. The computer-implemented method of claim 1, further comprising:
   determining that a root node in the hierarchy does not exist; and
   configuring the agent of the host computer to take a role of the root node.

3. The computer-implemented method of claim 1, wherein the registration message specifies a resource available to the host computer, the resource comprising a data store.

4. The computer-implemented method of claim 1, further comprising, in response to receiving a message that a particular host computer is missing:
   determining roles to which the particular host computer is configured to take; and
   assigning one or more other host computers to take the roles of the particular host computer.

5. The computer-implemented method of claim 1, further comprising:
   emitting a message notifying a plurality of management nodes of receipt of the registration message.

6. The computer-implemented method of claim 1, wherein the hierarchy of nodes is a tree.

7. The computer-implemented method of claim 1, wherein the hierarchy of nodes includes a plurality of root nodes.

8. The computer-implemented method of claim 1, wherein the distributed service comprises a scheduling service that places resource consumers on host computers using the hierarchy.

9. The computer-implemented method of claim 1, wherein the distributed service determines whether host computers are currently running using the hierarchy.

10. A non-transitory computer-readable storage medium containing executable instructions which, when executed by one or more processors, cause at least one computing device to at least:
    receive, from an agent executed by a host computer, a registration message comprising an indication of hardware resources available to the host computer;
    identify a requirement that must be satisfied for the host computer to be assigned as a child host of an existing leaf node in a hierarchy of nodes for a distributed service, wherein the requirement specifies that the hardware resources available to the host computer must include at least one of: a subset of resources available to at least one existing child host of the existing leaf node, and a superset of resources available to the at least one existing child host;
    determine that the host computer cannot be assigned as the child host of the existing leaf node based on the requirement; and
    configure the agent of the host computer to take a role of a new leaf node created in the hierarchy, wherein the agent causes the host computer to execute a resource consumer associated with the new leaf node.

11. The non-transitory computer-readable storage medium of claim 10, wherein the executable instructions, when executed, further cause the at least one computing device to at least:
    determine that a root node in the hierarchy does not exist; and
    configure the agent of the host computer to take a role of the root node.

12. The non-transitory computer-readable storage medium of claim 10, wherein the registration message specifies a resource available to the host computer, the resource comprising a data store.

13. The non-transitory computer-readable storage medium of claim 10, wherein the executable instructions, when executed, further cause the at least one computing device to at least, in response to receiving a message that a particular host computer is missing:
    determine roles to which the particular host computer is configured to take; and
    assign one or more other host computers to take the roles of the particular host computer.

14. The non-transitory computer-readable storage medium of claim 10, wherein the executable instructions, when executed, further cause the at least one computing device to at least:
    emit a message notifying a plurality of management nodes of receipt of the registration message.

15. The non-transitory computer-readable storage medium of claim 10, wherein the hierarchy of nodes is a tree.

16. The non-transitory computer-readable storage medium of claim 10, wherein the hierarchy of nodes includes a plurality of root nodes.

17. The non-transitory computer-readable storage medium of claim 10, wherein the distributed service comprises a scheduling service that places resource consumers on host computers using the hierarchy.

18. The non-transitory computer-readable storage medium of claim 10, wherein the distributed service determines whether host computers are currently running using the hierarchy.

19. A system, comprising:

a processor; and a memory, wherein the memory includes executable instructions which, when executed by the processor, cause at least one computing device to at least:

receive, from an agent executed by a host computer, a registration message comprising an indication of hardware resources available to the host computer;

identify a requirement that must be satisfied for the host computer to be assigned as a child host of an existing leaf node in a hierarchy of nodes for a distributed service, wherein the requirement specifies that the hardware resources available to the host computer must include at least one of: a subset of resources available to at least one existing child host of the existing leaf node, and a superset of resources available to the at least one existing child host;

determine that the host computer cannot be assigned as the child host of the existing leaf node based on the requirement; and configure the agent of the host computer to take a role of a new leaf node created in the hierarchy, wherein the agent causes the host computer to execute a resource consumer associated with the new leaf node.

20. The system of claim 19, wherein the executable instructions, when executed, further cause the at least one computing device to at least:

determine that a root node in the hierarchy does not exist; and configure the agent of the host computer to take a role of the root node.

\* \* \* \* \*